Nov. 21, 1944. F. A. KLAUS, JR 2,363,006
NUT AND BOLT SOCKET FASTENING
Filed June 17, 1942
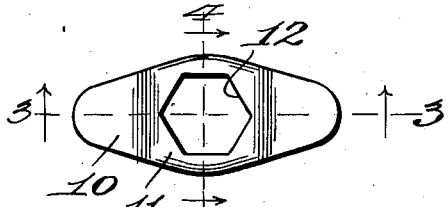
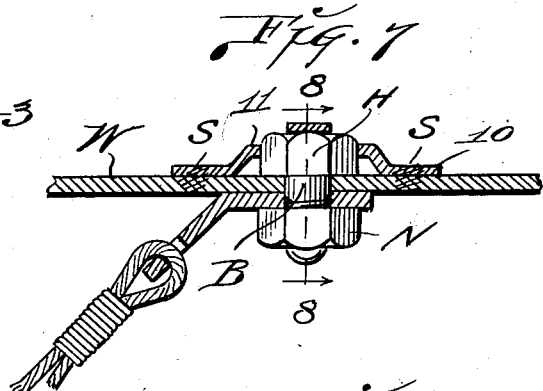
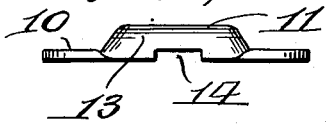
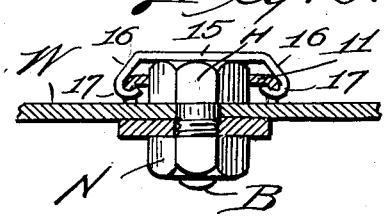
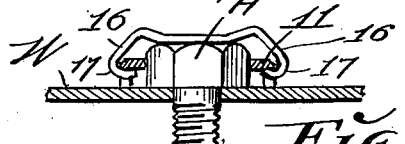
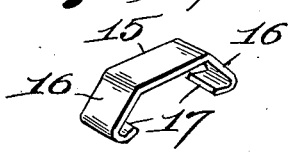
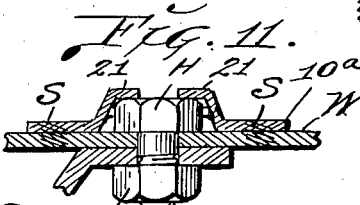
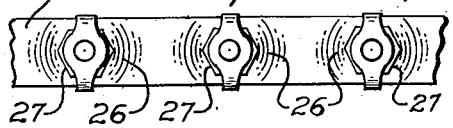
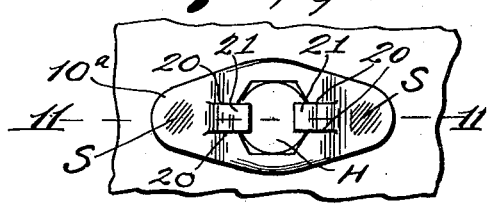
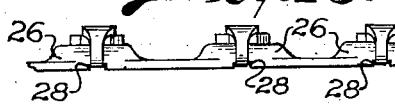
INVENTOR:—
FRANK A. KLAUS Jr.
By Martin O. Smith ATTY.

Patented Nov. 21, 1944

2,363,006

UNITED STATES PATENT OFFICE 2,363,006

NUT AND BOLT SOCKET FASTENING

Frank A. Klaus, Jr., Los Angeles, Calif.

Application June 17, 1942, Serial No. 447,370

6 Claims. (Cl. 151—44)

My invention relates generally to fastening devices, and more particularly to a nut and bolt socket fastening wherein the bolt functions to fasten two or more parts to each other, or as a stud to which a structural element, such as a plate, bracket, fixture or other part is to be rigidly secured.

An object of my invention is to provide a fastening of the character referred to which will maintain the inserted nut or bolt against rotation, and also against dropping out of the socket while the other part is being attached thereto or removed therefrom.

A further object of my invention is to provide a nut and bolt socket fastening that is adaptable for all shapes and sizes of nuts and bolts; to provide a fastening which is inexpensive of manufacture and which is of especial advantage wherever a large number of nuts and bolts or studs are employed, for instance, in the fabrication of airplanes.

During the course of fabrication of airplanes, numerous detailed parts are assembled together in successive stages to finally result in the finished product. The assembly of these parts is accomplished for the most part by three processes; namely, riveting, spot welding, and the bolting of the parts together, each of which methods has its own particular function, advantages and disadvantages.

Where bolts or machine screws are considered necessary, a form of fastening including what is known as a plate-nut has been developed, and widely used. This particular structure greatly facilitates the assembly and servicing of the airplane, but at the same time, there are certain inherent disadvantages of plate-nuts, and it is one of the objects of my invention to provide a relatively simple, practical and inexpensive fastening which will eliminate the use of the so-called plate-nuts.

Where the plate-nut type fastening is employed, three separate parts; namely, the part with the plate-nut, the part to be attached, and the bolt must be simultaneously alined perfectly. The bolt must then be held at right angles to the parts, and carefully turned about its axis until the threads are started into the plate nut.

Usually parts are attached by several bolts and unless all holes are perfectly coordinated, difficulty is encountered in attempting to start the bolts in the plate-nuts. Since most holes are drilled by drill-jigs, perfect coordination is not usually attainable, and as a result, the workmen encounter considerable difficulty in installing parts by this method, and where the installation must be accomplished by the workmen in a location not readily accessible as is very often the case in aircraft assembly and servicing, the difficulty encountered magnifies itself many times.

One of the objects of my invention is to produce a nut or bolt fastening that can be produced inexpensively, and in large quantities; in other words, to provide a device of this character that can be readily stamped with dies from sheet material in one or more simple operations.

For this reason my invention presents a construction particularly adapted to be formed from a plate of substantially uniform thickness.

With the foregoing and other objects in view, my invention consists in certain novel features of construction and arrangement of parts which will be hereinafter more fully described and claimed and illustrated in the accompanying drawing, in which:

Fig. 1 is a top plan view of the plate member of my improved nut and bolt socket fastening.

Fig. 2 is a side elevational view of the plate.

Fig. 3 is a longitudinal section taken on the line 3—3 of Fig. 1.

Fig. 4 is a cross section taken on the line 4—4 of Fig. 1.

Fig. 5 is a perspective view of a spring clip which combines with the plate in forming the socket fastening.

Fig. 6 is a plan view of a modified form of the spring clip.

Fig. 7 is a sectional view showing the socket fastening in position for use on a construction element.

Fig. 8 is a cross section taken on the line 8—8 of Fig. 7.

Fig. 9 is a cross section similar to Fig. 8 and showing a modified form of the spring clip.

Fig. 10 is a plan view of a modified form of socket fastening.

Fig. 11 is a longitudinal section taken on the line 11—11 of Fig. 10.

Figs. 12 and 13 are respectively plan and side views of a modified construction where a series of spaced nut or bolt head receiving sockets are formed on a metal strip.

Referring by numerals to the accompanying drawing and more particularly to the construction illustrated in Figs. 1 to 8 inclusive, 10 designates a socket-member, preferably formed of a metal plate, of any desired size and thickness and, while I have shown said plate as being substantially lozenge shaped, with rounded ends, it may be round, rectangular, triangular or any other practical shape, depending on the use to which the fastening is put. The middle portion of plate 10 is preferably slightly elevated with respect to its end portions, that is to say, the material of the plate is offset from the plane of the plate's body to form an elevated plate form extension 11; and formed in this elevated central portion, is an aperture 12, which engages the nut to prevent its rotation. In the drawing, the aperture is shown hexagonal in shape.

Formed integral with the sides of the elevated central portion of plate 11 are depending walls or flanges 13, the lower edges of which occupy the same plane with the under faces of the end portions of plate 10 and formed in central portions of said lower edges are notches 14. The nut or bolt head engaging member or keeper of the fastening (see Fig. 5) for holding the nut or bolt head in its socket is in the nature of a clip formed from a narrow strip of resilient metal and comprises a straight flat intermediate portion 15, depending end portions 16, which are preferably inclined outwardly and the ends of said depending portions terminate in upwardly and inwardly turned hooks 17.

When my improved socket fastening is applied for use, the seat-face of plate 10 is rigidly secured to a structural element W, on which the nut or bolt head is to seat, and which may be a wall, plate, sheathing, or cowling of an airplane, directly over a hole that is to receive the shank of a bolt or stud utilized in fastening another wall, plate, bracket, fixture or other part to the element W.

Plate 10 is secured to element W, for instance, by spot welding as designated by S in Figs. 7, 10 and 11, although other fastening means such as rivets, screws, or bolts may be employed.

The shank of the bolt or shank B which is used in fastening a plate, wall, fixture or bracket to element W, is now inserted through the bolt hole in said element W, thus positioning the head H of said bolt in the aperture 12, and after the plate, bracket or other part that is to be secured to element W is engaged on the shank of the bolt, a nut N is applied to the threaded end of the bolt.

Obviously, the arrangement of the bolt and nut as just described may be reversed, in which event the nut is fitted into aperture 12 in plate 10 directly over bolt hole in element W and the threaded end of the shank of bolt B, after passing through the part to be fastened to element W, and through the bolt hole in said element, enters the threaded aperture in the nut.

Inasmuch as the size and shape of aperture 12 corresponds to that of the nut or bolt head, the latter are positively held against rotation while positioned in said aperture.

To retain the head of bolt B in aperture 12 before the nut is applied to said bolt, or to retain the nut in said aperture before the threaded end of a bolt or stud is screwed into the nut, the clip is applied to the plate 10 with the intermediate portion 15 of said clip extending transversely across and in direct engagement with the outer faces of said bolt or nut and with the depending end portion 16 of the clip, overlying the side walls or flanges 13 of plate 10. As the clip is pressed to its final position, hooks 17 will flex outwardly as a result of contact with the side walls or flanges 13 and then snap into the notches 14, thereby securing the nut or bolt head in the socket comprising plate 10 and the clip which is detachably secured thereto. Thus, when the nut or bolt head is positioned in the socket, it is securely held against rotation and also prevented from dropping out of said socket while the bolt is being screwed into the nut or the nut screwed onto the bolt, thus effecting a saving of much time, labor and consequent expense while the parts are being assembled or disassembled.

In Fig. 9, I have illustrated a modified construction wherein the intermediate portion of the clip is depressed or bowed downwardly, so that when said clip is applied to the plate, the engagement of the depressed portion of the clip against the outer face of the bolt head or nut develops strains in the clip which tend to flex the hooks on the ends thereof inwardly, thereby establishing a more positive and firm engagement of the hooks in the notches on the sides of the plate.

In Fig. 6, I have illustrated a clip wherein the straight intermediate portion is provided with an opening 19, preferably a short longitudinally disposed slot for the accommodation of the end of the shank of a bolt or stud, in the event that said end projects beyond the outer face of the nut.

In Figs. 10 and 11, I have illustrated a modified construction wherein the plate 10a is provided with parallel slits 20, on opposite sides of the opening 12, thereby forming lips 21 which project toward each other, into said opening and these lips are bent from the plate upwardly and then towards each other, so as to engage somewhere on the outer end portion of the nut or bolt head at oppositely disposed points thereon in such a way as to retain it (see Fig. 11).

In the manufacture of my improved nut and bolt socket fastening, the aperture 12 in plate 10 may be a few thousandths of an inch larger than the nut or bolt head which occupies said opening and this condition, together with the resiliency of the metal that forms the spring clip 15, will enable the nut to tilt slightly in all directions, thus facilitating the engagement of the threaded end of the bolt in the nut and likewise permitting slight movement of the shank of a bolt seated in the fastening device when a nut is applied to the threaded portion of the bolt shank.

For the accommodation of a series of bolts or studs arranged in a row, in closely spaced relation, plate 10 may be elongated to provide a strip 25 of the required length and having properly spaced portions 26 pressed upwardly to correspond with the parts 11 and each of the latter provided with a nut or bolt head receiving aperture such as 27 and notches such as 28 for the reception of the hooked ends of resilient retaining members 29, thus forming a multiple fastening.

Thus, it will be seen that I have provided a nut and bolt socket fastening which is simple in structure, inexpensive of manufacture, and very effective in performing the functions for which it is intended.

It will be understood that minor changes in the size, form and construction of the various parts of my improved nut and bolt socket fastening may be made and substituted for those herein shown and described without departing from the spirit of the invention, the scope of which is set forth in the appended claims.

I claim as my invention:

1. A fastener for a nut or bolt head, including a socket-member in the form of a plate of substantially uniform thickness, said plate having its middle portion offset away from the plane of the plate, with a socket opening therein fitting to the periphery of the nut or bolt head; and means associated with the socket-member for engaging the outer end portion of the nut or bolt head to retain the same in the socket opening.

2. A fastener for a nut or bolt head including a socket-member in the form of a plate adapted to be secured to the part on which the nut seats, said plate having an angular socket opening receiving the nut to prevent the same from rotating, said plate also having oppositely disposed edges offset away from the seat face of the plate; and a keeper extending across the outer end of the nut, having inclined hooks at its ends capable of snapping under the said edges when the body of the keeper is pressed down against the nut.

3. A fastener for a nut or bolt head including a socket-member in the form of a plate adapted to be secured to the part on which the nut seats, said plate having an angular socket opening receiving the nut to prevent the same from rotating, said plate also having oppositely disposed edges offset away from the seat face of the plate, with flanges projecting toward said seat face; and a keeper extending across the outer end of the nut, having inclined hooks at its ends capable of snapping under the said flanges when the body of the keeper is pressed down against the nut.

4. A fastener for a nut or bolt head, including a socket-member in the form of a plate of substantially uniform thickness, said plate having its central portion offset away from the plane of the plate, to form a plate-like extension, said plate-like extension having a socket opening therein fitting to the periphery of the nut or bolt head; and means associated with the socket-member for engaging over the outer end of the nut or bolt head to retain the same in the socket opening.

5. A fastener for a nut or bolt head according to claim 4 in which the body portion of said socket-member is formed with oppositely disposed notches, and the ends of the keeper are formed with hooks to engage into the same.

6. A fastener according to claim 1, in which the keeper includes a tongue integral with the said plate engaging the outer end portion of the nut to retain the same in its socket.

FRANK A. KLAUS, Jr.